United States Patent
Kakuho et al.

(10) Patent No.: US 7,721,703 B2
(45) Date of Patent: May 25, 2010

(54) COMBUSTION CONTROL SYSTEM FOR INTERNAL COMBUSTION ENGINE

(75) Inventors: Akihiko Kakuho, Kanagawa (JP); Takashi Araki, Kanagawa (JP); Koichi Ashida, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 129 days.

(21) Appl. No.: 12/055,462

(22) Filed: Mar. 26, 2008

(65) Prior Publication Data

US 2008/0236546 A1    Oct. 2, 2008

(30) Foreign Application Priority Data

Mar. 27, 2007   (JP)   .............. 2007-082799

(51) Int. Cl.
  *F02M 43/00*   (2006.01)
  *F02B 13/00*   (2006.01)
(52) U.S. Cl. ...................... 123/304; 123/575
(58) Field of Classification Search ............... 123/304, 123/575–578, 431, 435, 295, 299, 300
  See application file for complete search history.

(56) References Cited

U.S. PATENT DOCUMENTS

| | | | | |
|---|---|---|---|---|
| 3,924,598 A | * | 12/1975 | Davis | ............... 123/306 |
| 5,050,555 A | * | 9/1991 | Mitsumoto | ........ 123/406.31 |
| 5,515,280 A | * | 5/1996 | Suzuki | ............... 701/29 |
| 5,755,211 A | * | 5/1998 | Koch | ............... 123/525 |
| 6,244,246 B1 | | 6/2001 | Hei Ma | |
| 6,505,582 B2 | | 1/2003 | Moteki et al. | |
| 6,959,693 B2 | * | 11/2005 | Oda | ............... 123/431 |
| 6,968,825 B2 | * | 11/2005 | Hitomi et al. | ........ 123/406.11 |
| 7,027,906 B2 | * | 4/2006 | Araki | ............... 701/104 |
| 7,225,787 B2 | * | 6/2007 | Bromberg et al. | ........ 123/198 A |
| 7,263,967 B2 | | 9/2007 | Hotta et al. | |
| 7,287,492 B2 | * | 10/2007 | Leone et al. | ............... 123/1 A |
| 2006/0278195 A1 | | 12/2006 | Hotta et al. | |

FOREIGN PATENT DOCUMENTS

| | | |
|---|---|---|
| JP | 2000-110595 | 4/2000 |
| JP | 2000-329013 | 11/2000 |
| JP | 2002-38981 | 2/2002 |
| JP | 2004-197660 | 7/2004 |
| JP | 2004-346832 | 12/2004 |
| JP | 2005-2914 | 1/2005 |
| JP | 2005-139945 | 6/2005 |
| JP | 2006-342772 | 12/2006 |

* cited by examiner

*Primary Examiner*—John T Kwon
(74) *Attorney, Agent, or Firm*—Drinker Biddle & Reath LLP

(57) ABSTRACT

In an embodiment, the invention provides an internal combustion engine, including a first fuel injector that supplies a first fuel to a first predetermined region in a combustion chamber, and a second fuel injector that supplies a second fuel to a second predetermined region in the combustion chamber. The second fuel has an octane number that is different than an octane number of the first fuel, and the second predetermined region is different from the first predetermined region. An ignition device is configured to start ignition of one of the first and second fuels based on an ignition signal. An operation condition detector detects at least one engine operating condition. A controller is configured to provide the ignition signal to the ignition device and to determine which one of the first and second fuels to ignite by the ignition device based on the engine operation condition.

16 Claims, 15 Drawing Sheets

HIGH RON FUEL: SUPPLIED TO OUTER
SIDE THROUGH PORT INJECTION

LOW RON FUEL: SUPPLIED TO INNER
SIDE THROUGH DIRECT INJECTION

HIGH RON FUEL: AFTER UNIFORMLY SUPPLIED, FUEL IS AIR-INJECTED TO OUTER SIDE AND COLLECTED TOWARDS INNER SIDE

LOW RON FUEL: SUPPLIED TO OUTER SIDE THROUGH DIRECT INJECTION

HIGH RON FUEL: SUPPLIED TO INNER SIDE
THROUGH PORT INJECTION

LOW RON FUEL: SUPPLIED TO OUTER SIDE
THROUGH DIRECT INJECTION

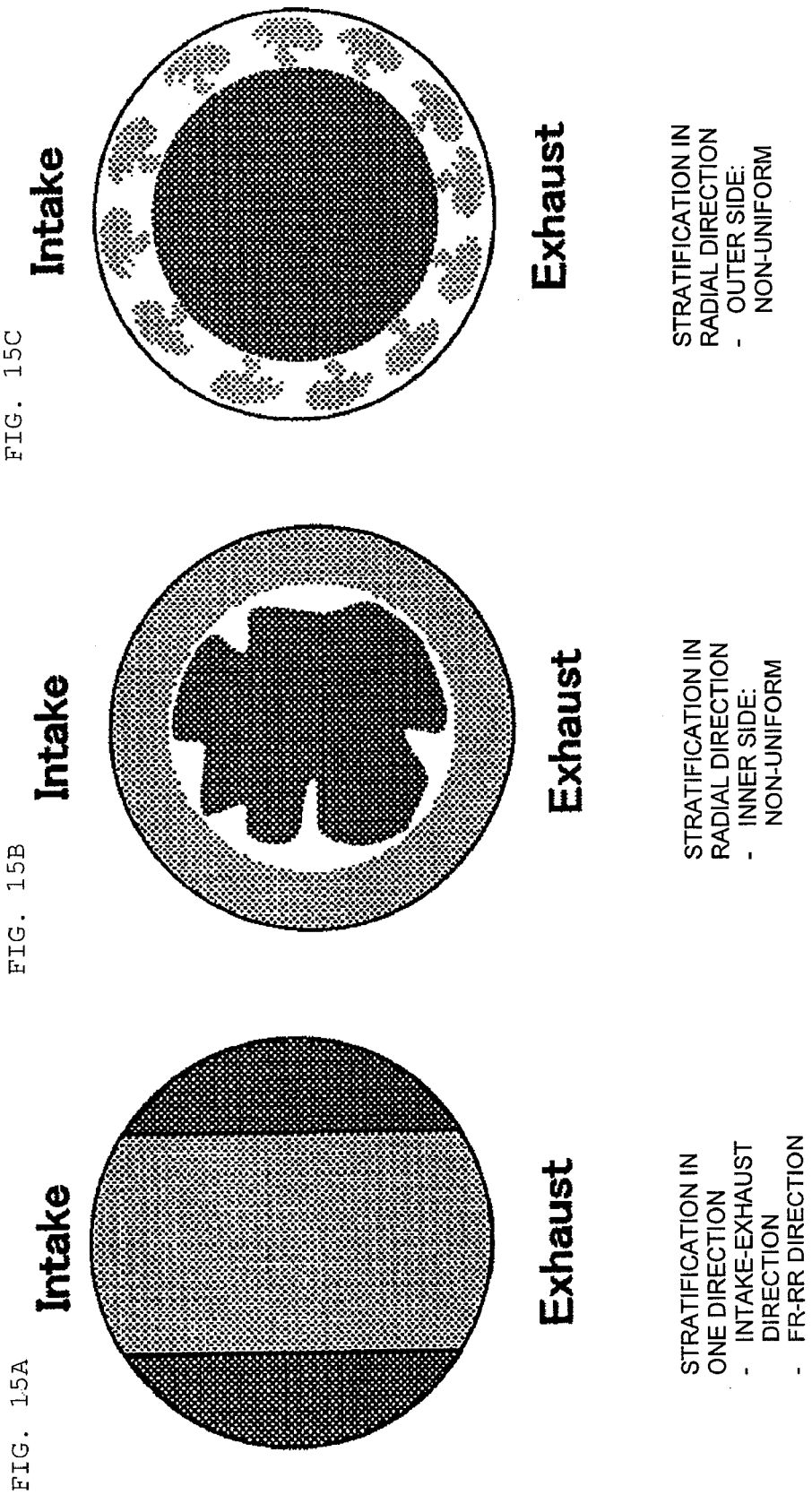

COMBUSTION CONTROL SYSTEM FOR INTERNAL COMBUSTION ENGINE

CROSS-REFERENCE TO RELATED APPLICATIONS

This application claims priority to Japanese Patent Application No. 2007-82799, filed Mar. 27, 2007, which is incorporated by reference herein in the entirety.

BACKGROUND OF THE INVENTION

1. Field of the Invention

The present invention relates to a combustion control system for an internal combustion engine that uses a plurality of fuels having different octane numbers.

2. Description of Related Art

A related art combustion control system for an internal combustion engine includes fuel injection valves that, respectively, inject a low octane fuel and a high octane fuel into a combustion chamber. During the compression stroke, fuel injection is performed such that the low and high octane fuels substantially do not overlap one another in the combustion chamber. The concentration of the gaseous mixture in the combustion chamber is prevented from being over-concentrated, fuel distributions different in octane number can be generated, and stable ignition and suppression of nitrogen oxide and smoke in compressed self ignition are compatibly implemented. Nevertheless, problems described below still remain unresolved.

In the event that distribution of the plurality of fuels having different octane numbers is generated, while preventing the fuels from substantially overlapping one another, fuel ignition is initiated with the low octane fuel. More specifically, compression self-ignition combustion is performed. Since the plurality of fuels having different octane numbers from one another are combusted independently of one another, ignition is facilitated. On the other hand, however, from the viewpoint of controlling combustion, there is a difficulty similar to other conventional cases of conventional compression self-ignition combustion. More specifically, when there is a change in operation conditions, and in particular, when the engine load is high, difficulties in combustion control are known. More specifically, when control is performed only to start ignition with the ignition of the low octane fuel regardless of the engine load, it is difficult to compatibly accomplish high thermal efficiency and output in a wide range of operation conditions.

BRIEF SUMMARY OF THE INVENTION

In view of the problems described above, an object of the present invention is to compatibly accomplish a low fuel consumption cost and a high output when combustion is performed by distributing a plurality of fuels having different octane numbers from one another to different portions of a combustion chamber.

In an embodiment, the invention provides an internal combustion engine, including a first fuel injector that supplies a first fuel to a first predetermined region in a combustion chamber, and a second fuel injector that supplies a second fuel to a second predetermined region in the combustion chamber. The second fuel has an octane number that is different than an octane number of the first fuel, and the second predetermined region is different from the first predetermined region. An ignition device is configured to start ignition of one of the first and second fuels based on an ignition signal. An operation condition detector detects at least one engine operating condition. A controller is configured to provide the ignition signal to the ignition device and to determine which one of the first and second fuels to ignite by the ignition device based on the engine operation condition.

In another embodiment, the invention provides a fuel control method for an internal combustion engine, including distributing a first fuel to a first predetermined region in a combustion chamber, distributing a second fuel to a second predetermined region in the combustion chamber, the second fuel having an octane number different than an octane number of the first fuel, the second predetermined region being different from the first predetermined region, detecting an operation condition of the engine, determining in accordance with the operation condition of the engine whether to start ignition of one of the first or second fuels, and igniting the determined fuel.

According to the present invention, switching between ignition start portions is performed corresponding to the engine operation condition. Consequently, combustion can be executed from a portion of fuel having an octane number suited for the operation condition, and hence optimal combustion can be implemented.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIGS. 15A to 15C are diagrams showing stratified patterns.

DETAILED DESCRIPTION OF THE PREFERRED EMBODIMENTS

Figure 1:
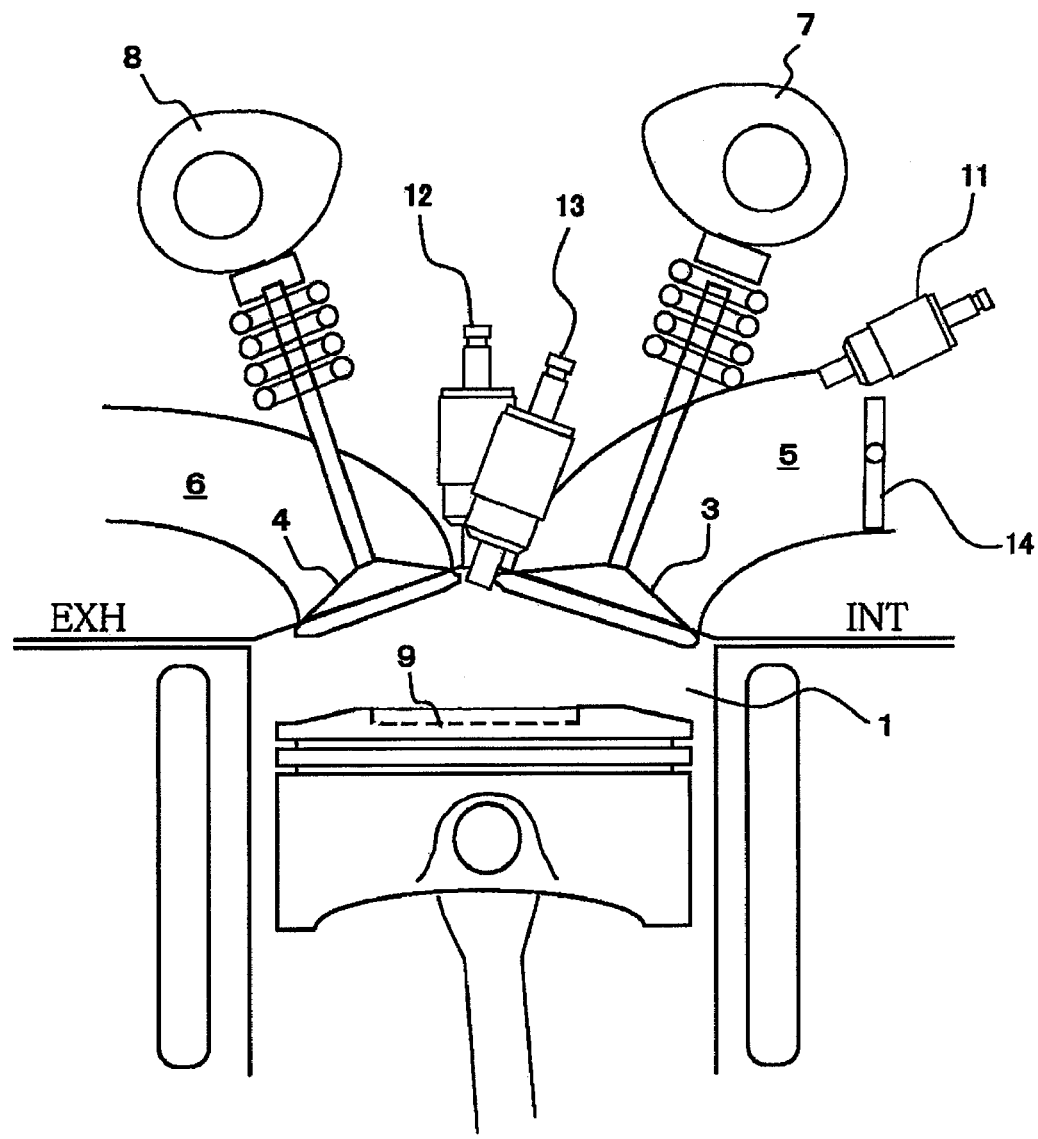
FIG. 1 is a configuration diagram showing an internal combustion engine in a first embodiment of the present invention.

FIG. 1 is a diagram showing an internal combustion engine according to a first embodiment of the present invention.

A combustion chamber 1, working as a main combustion chamber includes a cylinder head, a cylinder block and a piston. The combustion chamber 1 communicates with an intake port 5 and an exhaust port 6 via an intake valve 3 and an exhaust valve 4, respectively. The intake valve 3 and the exhaust valve 4 are opened and closed in operative association with an intake valve driving cam 7 and an exhaust valve driving cam 8, respectively. A cavity 9 or piston cavity is formed in a surface of a piston crown.

The intake port 5 is provided with a first fuel injection valve 11 for supplying a high octane fuel. A lower surface of the cylinder head includes a second fuel injection valve 12 for supplying a low octane fuel and a third fuel injection valve 13 that works as an ignition trigger device for supplying an initial ignition fuel.

The fuel to be sprayed from the first fuel injection valve 11 is directed to a peripheral area of the combustion chamber 1 in the form of an annulus, for example, via the intake valve 3. The first fuel injection valve 11 injects the high octane fuel during a relatively late timing of an intake stroke.

The fuel sprayed from the second fuel injection valve 12 is directed to the piston cavity 9 from the lower surface of the cylinder head in the center of the combustion chamber 1. The second fuel injection valve 12 injects the low octane fuel in the latter half of a compression stroke.

The fuel sprayed from the third fuel injection valve 13 is directed to the peripheral area of the combustion chamber 1 from the lower surface of the cylinder head in the center of the combustion chamber 1. More specifically, the low octane fuel, which serves as an initial ignition fuel in an area close to a compression top dead center, or TDC, is injected into the combustion chamber 1 in a dispersive manner. The low octane fuel thus being injected from the third fuel injection valve 13 preferably has a lower octane number or a higher cetane number than the low octane fuel being injected from the second fuel injection valve 12, but the fuels may be the same. As used in the Figures, RON refers to research octane number, or more generally—octane number. Fuel injection from the third fuel injection valve 13 is performed at a timing directly before the timing when the in-cylinder pressure increases to be readily ignitable, in which the density of the fuel spray mass is high. As such, although the fuel has the same octane number, the fuel can easily be usable as the initial ignition fuel.

Further, the intake port 5 has a swirl control valve 14 that works as a swirl generating device capable of generating swirl in the combustion chamber 1.

Figure 2:
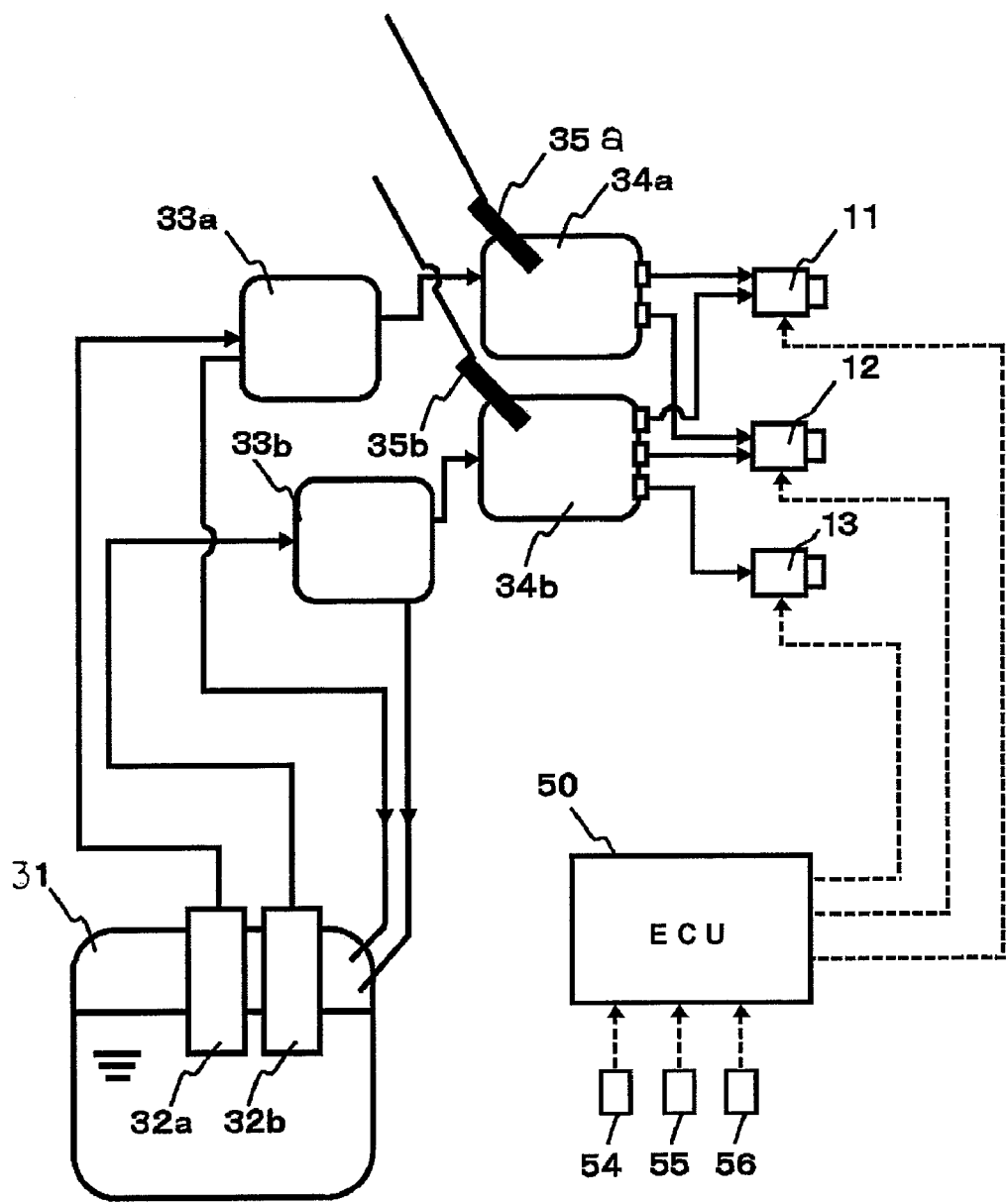
FIG. 2 is a diagram showing a system from a fuel tank to the combustion control system in the first embodiment.

FIG. 2 is a diagram showing a system including a fuel tank and the respective fuel injection valves 11 to 13.

A primary fuel tank 31 preliminarily stores fuel supplied from an external source. The fuel is supplied by a fuel pump 32a, 32b to respective fuel reformers 33a, 33b.

The fuel reformer 33a performs reformation of the fuel by utilizing exhaust air heat and a reforming catalyst to increase the octane number of the fuel supplied from the primary fuel tank 31. The fuel reformer 33b performs reformation of the fuel by utilizing exhaust air heat to reduce the octane number of the fuel supplied from the primary fuel tank 31.

A high octane fuel obtained through the reformation performed in the fuel reformer 33a is stored into a secondary fuel tank 34a. A low octane fuel obtained through the reformation performed in the fuel reformer 33b is stored into a secondary fuel tank 34b. The secondary fuel tank 34a includes a sensor 35a for detecting the amount of the high octane fuel. Similarly, the secondary fuel tank 34b includes a sensor 35b for detecting the amount of the low octane fuel. Methods for generating the reformed fuel and storing the fuel in the fuel tank may be similar to those described in U.S. Pat. No. 7,263,967.

The high and low octane fuels stored in the respective secondary fuel tanks 34a and 34b are supplied by booster pumps to the fuel injection valves 11, 12, and 13. By controlling the amount of the fuel to the respective fuel injection valves 11, 12, and 13, the high and low octane fuels can be supplied to the engine from the respective fuel injection valves 11, 12, and 13 at determined rates.

Signals from, for example, a crank angle sensor 54, a coolant temperature sensor 55, and an acceleration sensor 56 may be inputted into an engine control unit, or ECU 50. In accordance with the signals, the ECU 50 performs control of the fuel injection valves 11, 12, and 13.

Figure 3:
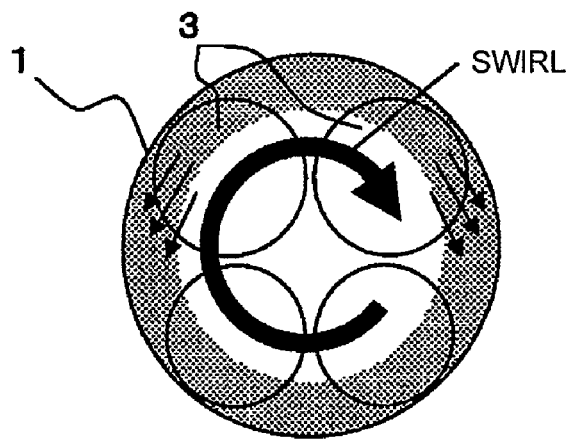
FIG. 3 is an explanatory diagram of a gaseous mixture forming method in the first embodiment.
Figure 3:
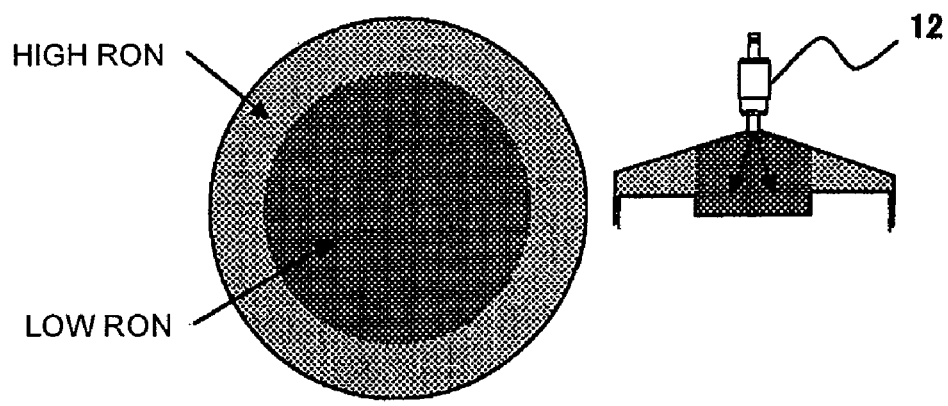

In the first embodiment, gaseous mixture formation is performed in a manner described below. The high octane fuel is distributed to a peripheral area of the combustion chamber 1, generally defined as an area near the cylinder wall of the combustion chamber 1, and the low octane fuel is distributed to a central area of the combustion chamber 1, generally defined as an area spaced inward from cylinder wall of the combustion chamber 1, as shown in FIG. 3.

First, during the latter portion of the intake stroke, the high octane fuel is injected from the first fuel injection valve 11, which is configured and arranged for communication with the intake port 5. The fuel from the first fuel injection valve 11 is injected in the intake port 5 and flows into the combustion chamber 1, through the intake valve 3. The fuel flows into the combustion chamber 1, is swirled by the swirl stream generated during the intake stroke, and is distributed to the peripheral area of the combustion chamber 1.

Subsequently, in the latter half of the compression stroke, the low octane fuel is injected from the second fuel injection valve 12 into the cylinder. The fuel injection is aimed toward the piston cavity 9, whereby the gaseous mixture of the low octane fuel is distributed to an upper portion of the cavity 9.

In the manner described above, fuel distributions different in octane number can be generated. That is, the high octane fuel is distributed to the peripheral area of the combustion chamber 1, and the low octane fuel is distributed to the central area of the combustion chamber 1.

Figure 4:
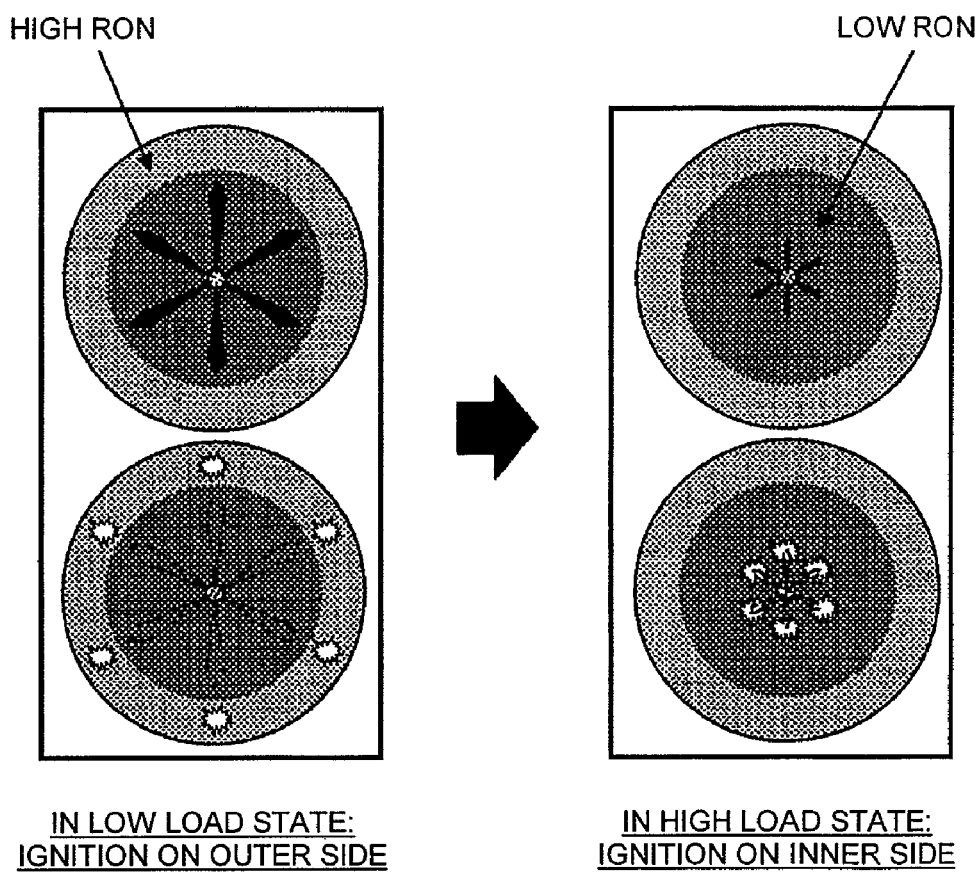
FIG. 4 is an explanatory diagram of a combustion method to be executed in the first embodiment.

Combustion according to the first embodiment is performed in a manner described below and in FIG. 4.

The fuel ignition is performed as follows. The low octane fuel, which is used as the initial ignition fuel, is discretely injected into the combustion chamber 1 from the third fuel injection valve 13.

In the gaseous mixture distribution described above, ignition is started with the high octane fuel on the peripheral area of the combustion chamber 1 in a low load state, whereas ignition is started with the low octane fuel on the central area of the combustion chamber 1 in a high load state.

For this reason, a fuel injection timing of the third fuel injection valve 13 may be advanced in the low load state, or retarded in the high load state.

When the injection timing of injection valve 13 is advanced, the in-cylinder pressure is relatively low, so the fuel can be dispersed to a larger volume, toward the peripheral area. Concurrently, the in-cylinder temperature also is low, and hence an ignition retardation time period is increased, so that ignition is started after the fuel has dispersed toward the cylinder wall.

Conversely, when the injection timing is retarded, ignition is advanced to initialize in the central area of the combustion chamber 1. Thus, a fuel ignition position can be controlled through control of the injection timing.

In the low load state, the injection timing of the third fuel injection valve 13 is advanced to cause the low octane fuel, which is used as the initial ignition fuel, to reach into the high octane fuel on the peripheral area of the combustion chamber 1. Thereby, ignition is started with the high octane fuel on the peripheral area of the combustion chamber 1, and combustion is executed.

In the high load state, the injection timing of the third fuel injection valve 13 is retarded to cause the low octane fuel, which is used as the initial ignition fuel, to stay in the area of the low octane fuel on the central area of the combustion chamber 1. Thereby, ignition is started with the low octane fuel on the central area of the combustion chamber 1, and the combustion is executed.

According to the first embodiment, switching control is performed by the ignition trigger device to set the area where the initial ignition is started to be the portion for distribution of the high octane fuel in the low load state, or the portion for distribution of the low octane fuel in the high load state. Thereby, effects and advantages as described below can be obtained.

In the low load state, combustion is started with fuel that is likely to remain uncombusted as uncombusted hydrocarbons (HC), thereby improving the combustion efficiency. On the other hand, in the high load state, by combusting the low octane fuel earlier, knocking induced by adiabatic compression due to a combustion flame in an end gas portion can be prevented.

Further, according to the first embodiment, among the fuels having different octane number to be supplied into the combustion chamber 1, the fuel having high octane number is distributed to the peripheral area of the combustion chamber 1, and the fuel having low octane number is distributed to the central area of the combustion chamber 1. The fuels are supplied in the manner described above to the combustion chamber 1, thereby, combustion is executed by starting combustion with the high octane fuel in the low load state, and with the low octane fuel in the high load state. Thereby, effects and advantages as described below can be obtained.

In the low load state, combustion is started from the peripheral area of the combustion chamber 1. In this case, a near-wall surface region where the combustion temperature increases is set as an initial combustion portion, and the fuel near the wall, which is prone to be uncombusted because of flame quenching, is securely combusted. Thereby, the combustion efficiency can be improved. In particular, the combustion efficiency improvement can be advantageously implemented in engines of the type in which a significant dilution of the gaseous mixture is performed.

Alternatively, in the event of lean combustion being performed in a low load region, the combustion temperature is dependant on a combustion air-to-fuel ratio, and hence does not relatively increase, such that the heat loss is not greatly exacerbated even by combustion in the near-wall surface region. However, it is contemplated that, in operations being performed with an air-to-fuel ratio close to a theoretical or stoichiometric air-to-fuel ratio in the high load region, when combustion is started from the near-wall surface region, the heat loss is increased. As such, in the high load state, combustion is started from a central area of the combustion chamber 1, thereby preventing such a heat loss increase associated with the combustion in the near-wall surface region.

Further, the first embodiment has an advantage in that, for example, a spark plug for ignition does not have to be provided in the combustion chamber 1, and hence limitations regarding the valve opening area size are reduced.

Figure 5:
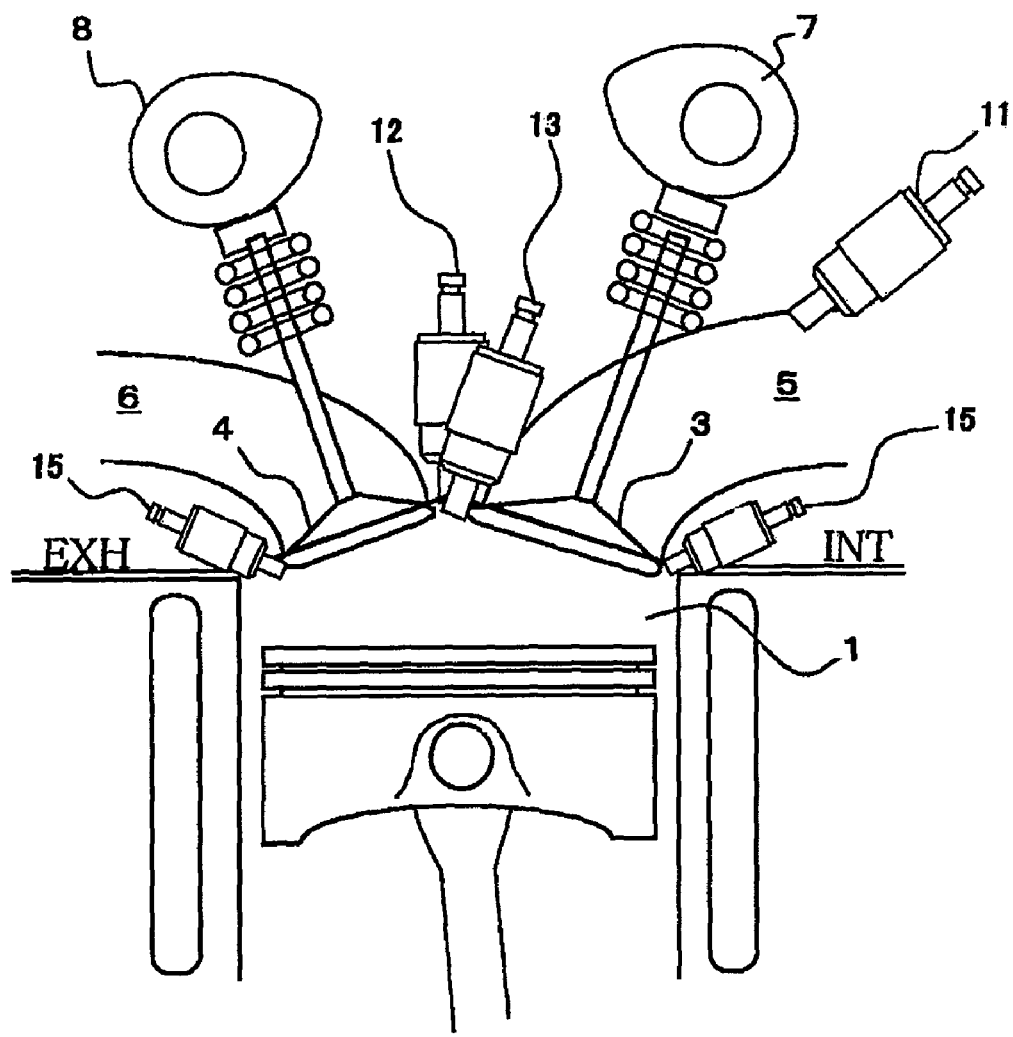
FIG. 5 is configuration diagram showing an internal combustion engine in a second embodiment of the present invention.

FIG. 5 is diagram showing an internal combustion engine according to a second embodiment of the present invention. The same numerals designate portions of configurations common to those of the internal combustion engine in the first embodiment.

The second embodiment includes a pair of air injection valves 15 as a device for distributing fuels having different octane numbers to different areas in the combustion chamber 1. The respective air injection valves 15 are directed towards the interior of the combustion chamber 1 so as to inject air or exhaust gas recirculation (EGR) along a tangential direction of the cylinder bore. In the present embodiment, the respective air injection valves 15 are controlled by a signal supplied from the ECU 50.

The first fuel injection valve 11 for supplying the high octane fuel is directed towards the central area in the combustion chamber 1 via the intake valve 3. The second fuel injection valve 12 for supplying the low octane fuel is directed from the lower surface of the cylinder head towards the peripheral area in the combustion chamber 1. Other configurations are substantially the same as those of the first embodiment.

Figure 6:
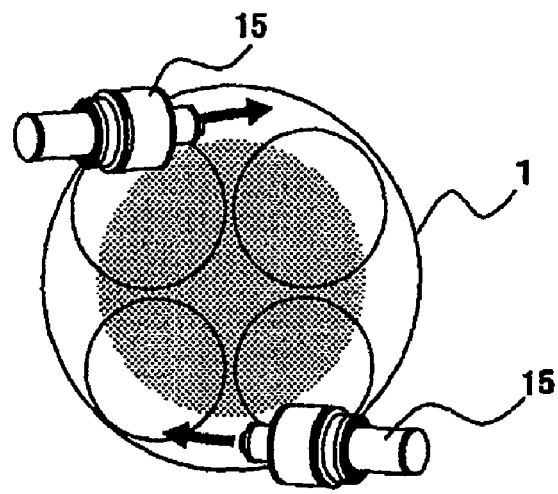
FIG. 6 is an explanatory diagram of a gaseous mixture forming method to be executed in the second embodiment.
Figure 6:
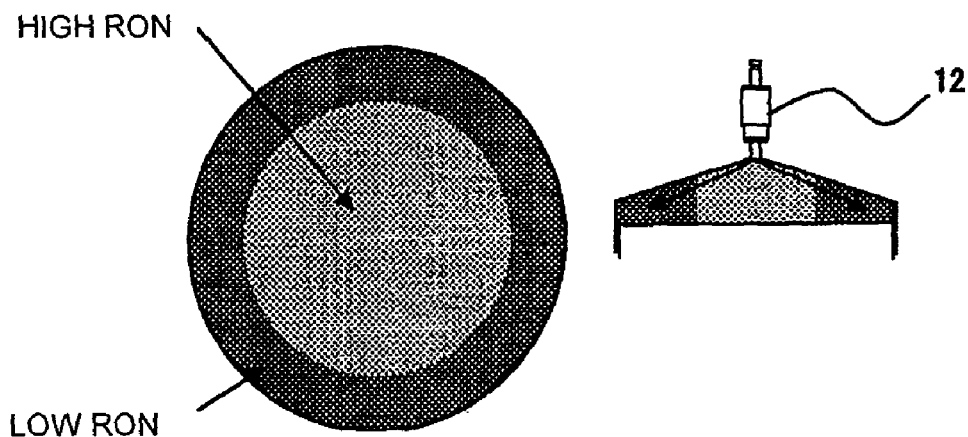

The gaseous mixture is formed in the second embodiment in a manner described below. The high octane fuel is distributed to the central area of the combustion chamber 1, and the low octane fuel is distributed to the peripheral area of the combustion chamber 1 (see FIG. 6).

First, the high octane fuel is injected from the first fuel injection valve 11 mounted to the intake port 5 to flow into the cylinder in the intake stroke. While the fuel is injected to the intake port 5 similarly as in the first embodiment, fuel injection directed to the peripheral area of the combustion chamber 1 is not specifically performed. Consequently, the gaseous mixture of the fuel and air once drawn in the combustion chamber 1 is substantially uniformly generated.

In addition to the gaseous mixture, air or EGR is injected and supplied from the air injection valve 15 during the transition from a late phase of the intake stroke to a near-midway phase of the compression stroke. Thereby, the high octane fuel is compressed towards the central area of the combustion chamber 1, and the air is distributed towards the peripheral area of the combustion chamber 1.

Then, the low octane fuel is injected from the second fuel injection valve 12 and distributed towards the peripheral area of the combustion chamber 1.

In the manner described above, fuel distributions different in octane number can be generated. That is, the high octane fuel is distributed to the central area of the combustion chamber 1, and the low octane fuel is distributed to the peripheral area of the combustion chamber 1.

Figure 7:
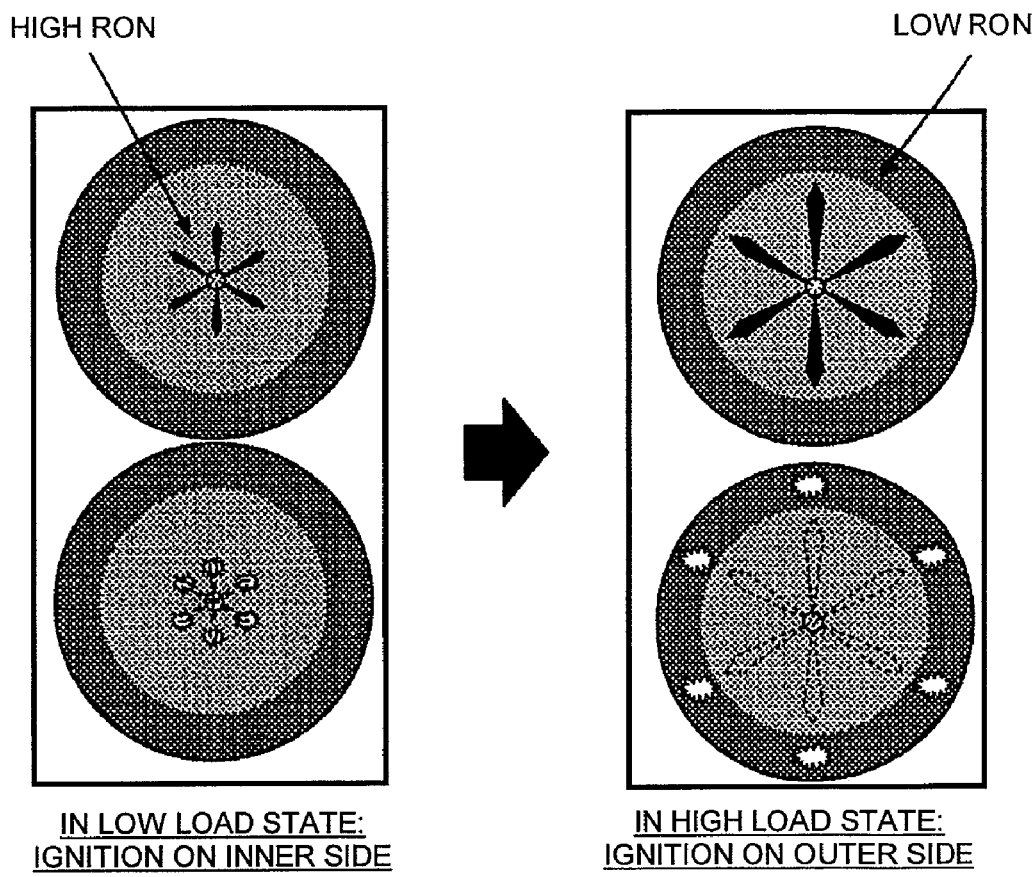
FIG. 7 is an explanatory diagram of a combustion method to be executed in the second embodiment.

Ignition or combustion in the second embodiment is performed in a manner described below, and as illustrated in FIG. 7.

The fuel ignition is performed in the manner that the low octane fuel, which is used as the initial ignition fuel, is discretely injected into the combustion chamber 1 from the third fuel injection valve 13 mounted in the combustion chamber 1.

In the gaseous mixture distribution described above, ignition is started with the high octane fuel on the central area of the combustion chamber 1 in the low load state, whereas ignition is started with the low octane fuel on the peripheral area of the combustion chamber 1 in the high load state.

For this reason, the fuel injection timing of the third fuel injection valve 13 is set to be retarded in the low load state, but is set to be advanced in the high load state.

In the low load state, the injection timing of the third fuel injection valve 13 is retarded to thereby cause the low octane fuel, which is used as the initial ignition fuel, to stay in the area of the high octane fuel in the central area of the combustion chamber 1. Thereby, ignition is started with the high octane fuel on the central area of the combustion chamber 1, and combustion is executed.

In the high load state, the injection timing of the third fuel injection valve 13 is advanced to thereby cause the low octane fuel, which is used as the initial ignition fuel, to reach the area of the low octane fuel in the peripheral area of the combustion chamber 1. Thereby, ignition is started with the low octane fuel on the peripheral area of the combustion chamber 1, and combustion is fully executed.

According to the second embodiment, among the fuels having different octane number to be supplied into the combustion chamber 1, the fuel having a high octane number is distributed to the central area of the combustion chamber 1, and the fuel having a low octane number is distributed to the peripheral area of the combustion chamber 1. The fuels are supplied in the manner described above into the combustion chamber 1, thereby, combustion is executed by starting combustion with the high octane fuel in the low load state, and with the low octane fuel in the high load state. Thereby, effects and advantages can be obtained as described below.

In the low load state, combustion is started from the central area of the combustion chamber 1 with the high octane fuel. In the event that the combustion air-to-fuel ratio is close to the theoretical or stoichiometric air-to-fuel ratio in the low load state, when combustion is started from the peripheral area, there is a concern that the heat loss is increased. So, preferably, combustion is started from the central area of the combustion chamber 1, and self-ignition combustion is performed in the peripheral area of the combustion chamber 1, sequentially.

In contrast, combustion is started from the peripheral area of the combustion chamber 1 with the low octane fuel. In the event that a large or sufficient amount of the high octane fuel cannot be supplied in the high load state, when ignition is started in the state wherein the low octane fuel is disposed on the central area of the combustion chamber 1, it is contemplated that knocking occurs in association with self-ignition of the low octane fuel before combustion of the low octane fuel is completed and combustion of the high octane fuel is initiated. In such an event, the low octane fuel is preferably combusted at an early timing from many ignition points to thereby prevent such self-ignition. In order to effectively reduce the flame propagation distance, it is advantageous that the low octane fuel is disposed on the peripheral area and combustion is started from the peripheral area.

Accordingly, the manner described above is advantageous when a large or sufficient amount of the high octane fuel cannot be supplied and when the combustion air-to-fuel ratio is set to the near-theoretical or stoichiometric air-to-fuel ratio while controlling the engine load to be reduced by use of, for example, a throttling or variable valve mechanism.

A modified example of the second embodiment will be described below.

As described above, in the second embodiment, the ignition start portion is variable in the manner that the injection timing of the third fuel injection valve 13 for supplying the initial ignition fuel is regulated, and the distribution position of the initial ignition fuel is thereby differentiated. In a configuration including a variable compression ratio setting mechanism capable varying the compression ratio of the engine, the distribution position of the initial ignition fuel can be differentiated in a manner that the compression ratio is regulated by the variable compression ratio setting mechanism to thereby regulate an in-combustion chamber atmospheric pressure in the event of fuel injection of the third fuel injection valve 13 for supplying the initial ignition fuel. This manner is adaptable because the dispersion of the fuel injected from the third fuel injection valve 13 varies with the in-cylinder pressure in the event of fuel injection. For the variable compression ratio setting mechanism, the mechanism such as disclosed in U.S. Pat. No. 6,505,582, for example, may be used.

More specifically, in the low load state, with the compression ratio being increased, the low octane fuel, which is injected from the third fuel injection valve 13 and is used as the initial ignition, is led to stay in the area of the high octane fuel in the central area of the combustion chamber 1. Then, ignition is started with the high octane fuel in the central area of the combustion chamber 1, and combustion is fully executed.

In the high load state, with the compression ratio being reduced, the low octane fuel, which is injected from the third fuel injection valve 13 and is used as the initial ignition fuel, is led to reach into the area of the low octane fuel on the peripheral area of the combustion chamber 1. Then, ignition is started with the low octane fuel on the peripheral area of the combustion chamber 1, and combustion is fully executed.

The increase in the compression ratio in the low load state leads to an improvement in output power, the reduction in the compression ratio in the high load state leads to knocking suppression. Accordingly, from this viewpoint as well, the manner of ignition and combustion is effective.

Thus, since the distribution of the low octane fuel, which is used as the initial ignition fuel, is controlled to be varied, the compression ratio control (output power/knocking control) corresponding to the engine load and the ignition position control can be synchronously performed, and excellent combustion can be executed in many operating conditions.

Figure 8:
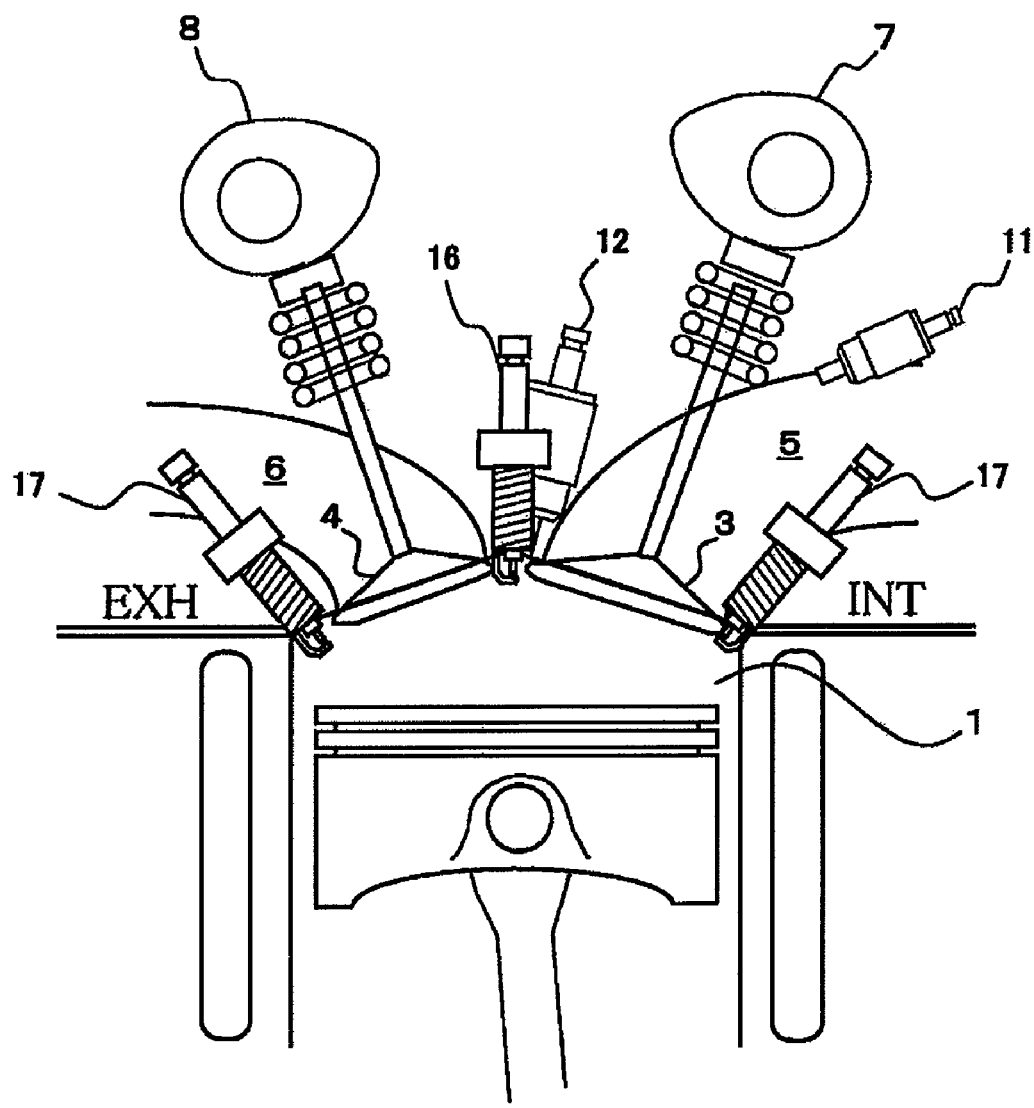
FIG. 8 is a configuration diagram showing an internal combustion engine in a third embodiment of the present invention.

FIG. 8 is a configuration diagram showing an internal combustion engine according to a third embodiment of the present invention. The same numerals designate portions of configurations common to those of the internal combustion engine in the first embodiment.

The third embodiment includes, as ignition trigger devices, a spark plug 16 in place of the third fuel injection valve 13 and a pair of spark plugs 17. More specifically, the spark plug 16 is provided in the central area of the combustion chamber 1, and the pair of spark plugs 17 are provided in peripheral areas of the combustion chamber 1. The spark plugs 16 and 17 are selectively used corresponding to engine operation conditions.

The first fuel injection valve 11 supplying the high octane fuel is directed towards the central area in the combustion chamber 1 via the intake valve 3. The second fuel injection valve 12 supplying the low octane fuel is directed from the lower surface of the cylinder head in the center of the combustion chamber 1 towards the peripheral area in the combustion chamber 1. Other configurations are substantially the same as those of the first embodiment.

Figure 9:
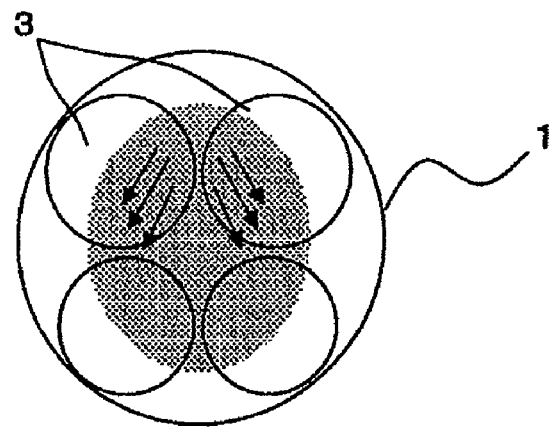
FIG. 9 is an explanatory diagram of a gaseous mixture forming method to be executed in the third embodiment.
Figure 9:
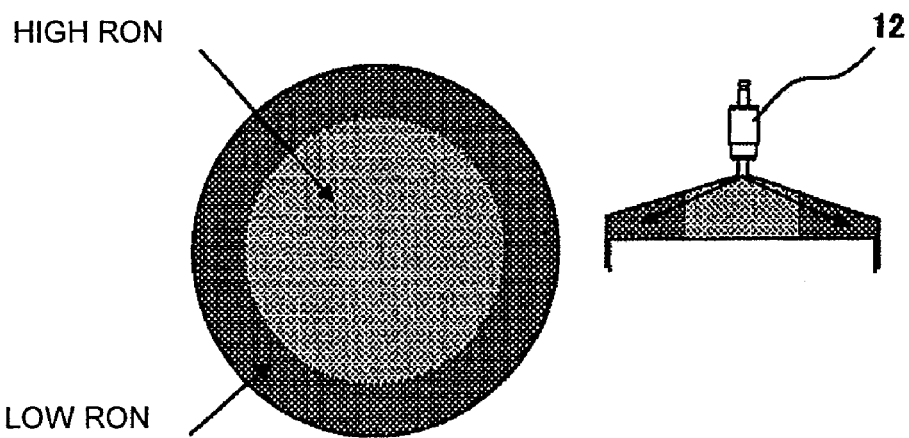

The gaseous mixture is formed in the third embodiment in a manner described below. Similarly as in the second embodiment, the high octane fuel is distributed to the central area of the combustion chamber 1, and the low octane fuel is distributed to the peripheral area of the combustion chamber 1, as shown in FIG. 9.

First, during a relatively late timing of the intake stroke, the high octane fuel is injected from the first fuel injection valve 11, which is mounted to be in fluid communication with the intake port 5. The fuel from the first fuel injection valve 11 is injected towards the central area of the combustion chamber 1 via the intake valve 3 and flows into the combustion chamber 1. When, similarly as in the first embodiment, a swirl stream has been generated in the combustion chamber 1, since a large amount of the fuel is not mixed along the peripheral area of the cylinder, the fuel stays on the central area of the combustion chamber 1.

In the latter half of the compression stroke, the low octane fuel is injected from the second fuel injection valve 12 towards the peripheral area of the combustion chamber 1 so that the low octane fuel is distributed to the peripheral area of the combustion chamber 1.

In the manner described above, the fuel distributions different in octane number can be generated. That is, the high octane fuel is distributed to the central area of the combustion chamber 1, and the low octane fuel is distributed to the peripheral area of the combustion chamber 1.

Figure 10:
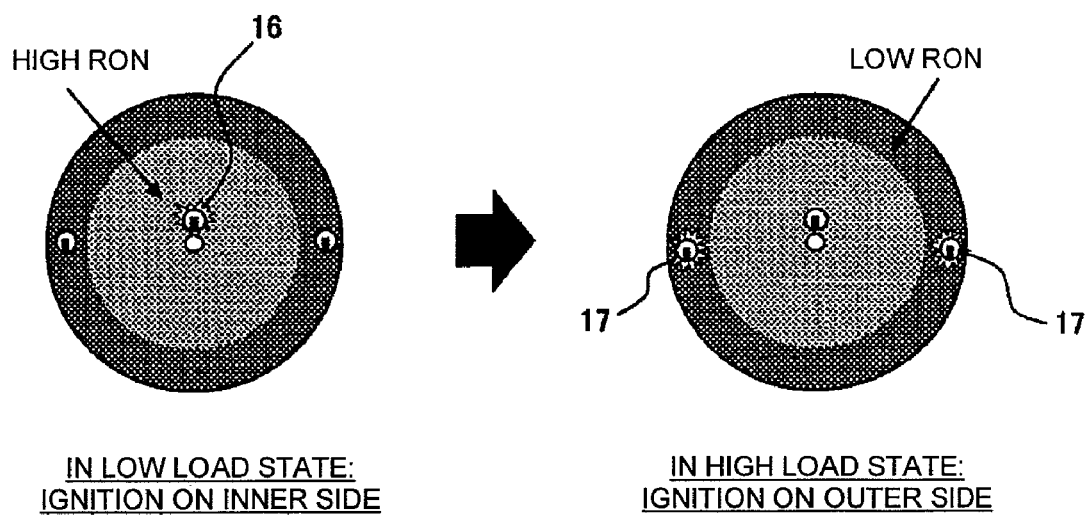
FIG. 10 is an explanatory diagram of a combustion method to be executed in the third embodiment.

Ignition (combustion) in the third embodiment is performed in a manner described below and in FIG. 10.

In the gaseous mixture distribution described above, in the low load state, the spark plug 16 on the central area of the combustion chamber 1 is used to initialize ignition of the high octane fuel in the central area of the combustion chamber 1, and the fuel is combusted.

In contrast, in the high load state, the two spark plugs 17 on the peripheral area of the combustion chamber 1 are used to initialize ignition of the low octane fuel in the peripheral area of the combustion chamber 1, and combustion is executed.

According to the third embodiment, the plurality of spark plugs 16 and 17, respectively provided corresponding to the ignition start areas, are used as an ignition trigger device and are selectively operated corresponding to the engine operation conditions. Thereby, operations, such as the ignition timing and position, can be securely controlled without being influenced by the operation states.

Figure 11:
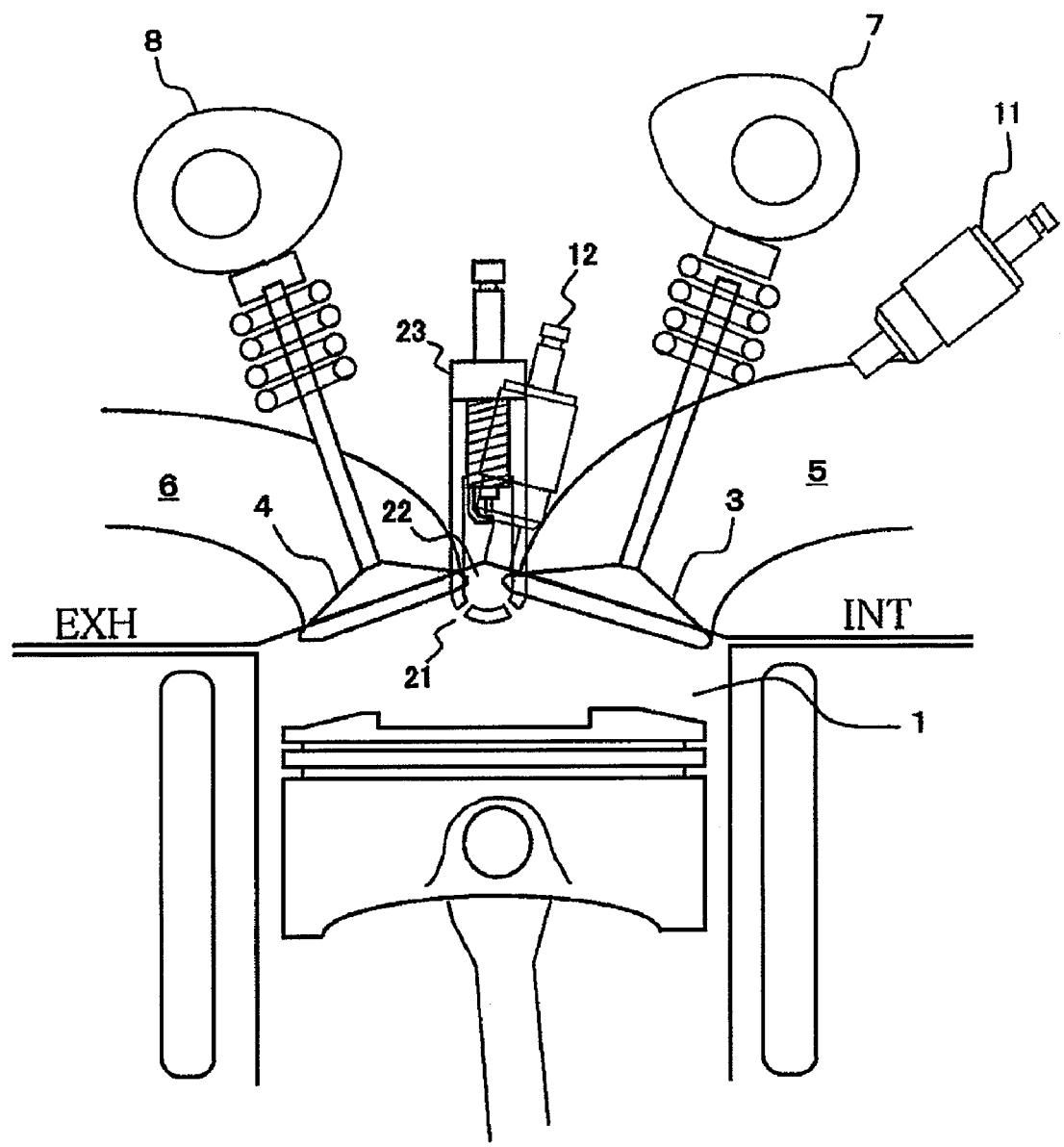
FIG. 11 is a configuration diagram showing an internal combustion engine in a fourth embodiment of the present invention.

FIG. 11 is a diagram showing an internal combustion engine according to a fourth embodiment of the present invention. The same numerals designate portions of configurations common to those of the internal combustion engine in the first embodiment.

The fourth embodiment includes a torch-type ignition that works as an ignition trigger device. The torch-type ignition includes an auxiliary chamber 22 provided in bi-directional communication with the combustion chamber 1 through an opening 21, and a spark plug 23 for igniting fuel filled in the auxiliary chamber 22, in place of the third fuel injection valve 13 and the spark plugs 16 and 17. The torch-type ignition provides a flame dispersively through the opening 21.

The gaseous mixture is formed in the combustion chamber 1 in one of the following two manners. In one manner, similarly as in the first embodiment, the high octane fuel is distributed to the peripheral area of the combustion chamber 1 and the low octane fuel is distributed to the central area of the combustion chamber 1. In the other manner, as in the second and third embodiments, the high octane fuel is distributed to the central area of the combustion chamber 1 and the low octane fuel is distributed to the peripheral area of the combustion chamber 1.

For fuel supply into the auxiliary chamber 22, the fuel in the combustion chamber 1 may be compressed during the compression stroke and directed into the auxiliary chamber 22. Alternatively, a fuel injection valve may be provided to directly supply the fuel into the auxiliary chamber 22.

For starting ignition in the combustion chamber 1, the flame exiting from the auxiliary chamber 22 including the spark plug 23 is used.

A propagation force of the flame is controllable in accordance with an ignition position in the auxiliary chamber 22 and the concentration of the gaseous mixture in the auxiliary chamber 22. For example, when the ignition position in the auxiliary chamber 22 is moved close to the opening 21, the flame exits before the pressure in the auxiliary chamber 22 sufficiently increases, and the propagation force is reduced. Alternatively, when ignition is performed at an upper portion of the auxiliary chamber 22, the pressure in the auxiliary chamber 22 sufficiently increases before the flame exits the opening 21. Consequently, the propagation force of the torch-shaped flame is increased.

Figure 12:
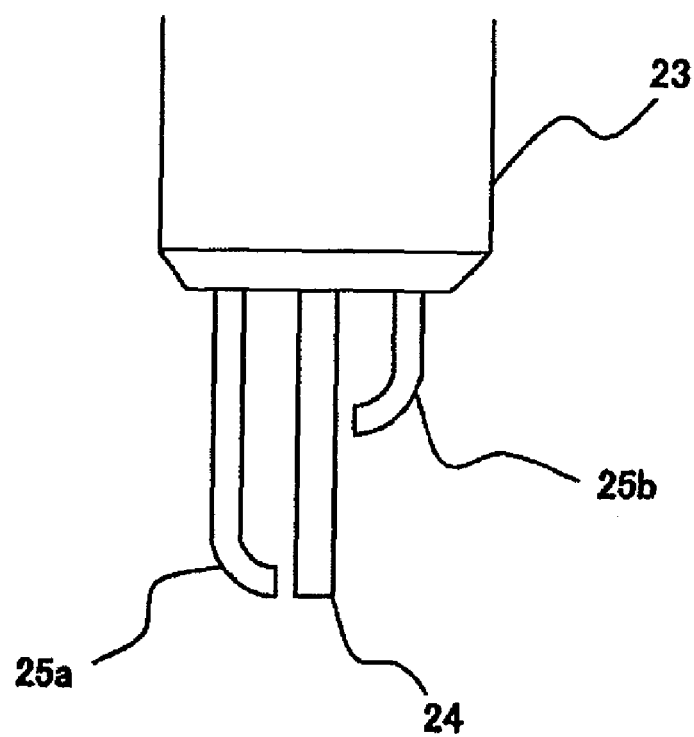
FIG. 12 is a detail view of a spark plug in an auxiliary chamber in the fourth embodiment.

FIG. 12 shows a practical example of how the ignition position of the spark plug 23 is changed. More specifically, two lateral electrodes 25a and 25b are provided in different positions on a single central electrode 24 protruding from a leading edge of the spark plug 23. In this case, when ignition is executed on the side of the leading edge of the central electrode 24 by use of the one lateral electrode 25a, the propagation force of the flame can be reduced. However, when ignition is executed on the side of the base end of the central electrode 24 by use of the other lateral electrode 25b, the propagation force of the flame can be increased.

In the case where the concentration of the gaseous mixture has been changed, the energy of combustion is proportionally higher as the concentration of the gaseous mixture is increased, and also the flame propagation force of the flame is increased. Accordingly, the flame propagation force can be reduced by reducing the concentration of the gaseous mixture, so that control of the position for starting ignition can be controlled.

As described above, according to the present embodiment, similarly as in the first embodiment, when the high octane fuel has been distributed to the peripheral area of the combustion chamber 1, and the low octane fuel has been distributed to the central area of the combustion chamber 1, the propagation force of the flame is increased in the low load state, and ignition is started with the high octane fuel on the peripheral area of the combustion chamber 1. On the other hand, in the high load state, the propagation force of the flame is reduced, and ignition is started with the low octane fuel on the central area of the combustion chamber 1.

In contrast, similarly as in the second and third embodiments, when the high octane fuel has been distributed to the central area of the combustion chamber 1, and the low octane fuel has been distributed to the peripheral area of the combustion chamber 1, the propagation force of the torch-shaped flame is reduced in the low load state, and ignition is started with the high octane fuel on the central area of the combustion chamber 1. On the other hand, in the high load state, the propagation force of the flame is increased, and ignition is started with the low octane fuel on the peripheral area of the combustion chamber 1.

According to the fourth embodiment, the torch-type ignition is used as the ignition trigger device. The torch-type ignition includes the auxiliary chamber 22 provided in fluid communication with the combustion chamber 1 through the opening 21, and the spark plug 23 for igniting fuel in the auxiliary chamber 22. The torch-type ignition expels out a flame dispersively from the opening 21. With the torch-type ignition being used, the propagation force of the flame is regulated to thereby control the position for starting ignition. Consequently, a lean combustion limit can be significantly increased, so that the thermal efficiency of partial load combustion can be improved, and rapid combustion of the low octane fuel under high load can be implemented.

The gaseous mixture forming methods and ignition methods in the first to fourth embodiments can be carried out in combination. A control example for a combination will be described below with reference to flow diagrams shown in FIGS. 13 and 14.

Figure 13:
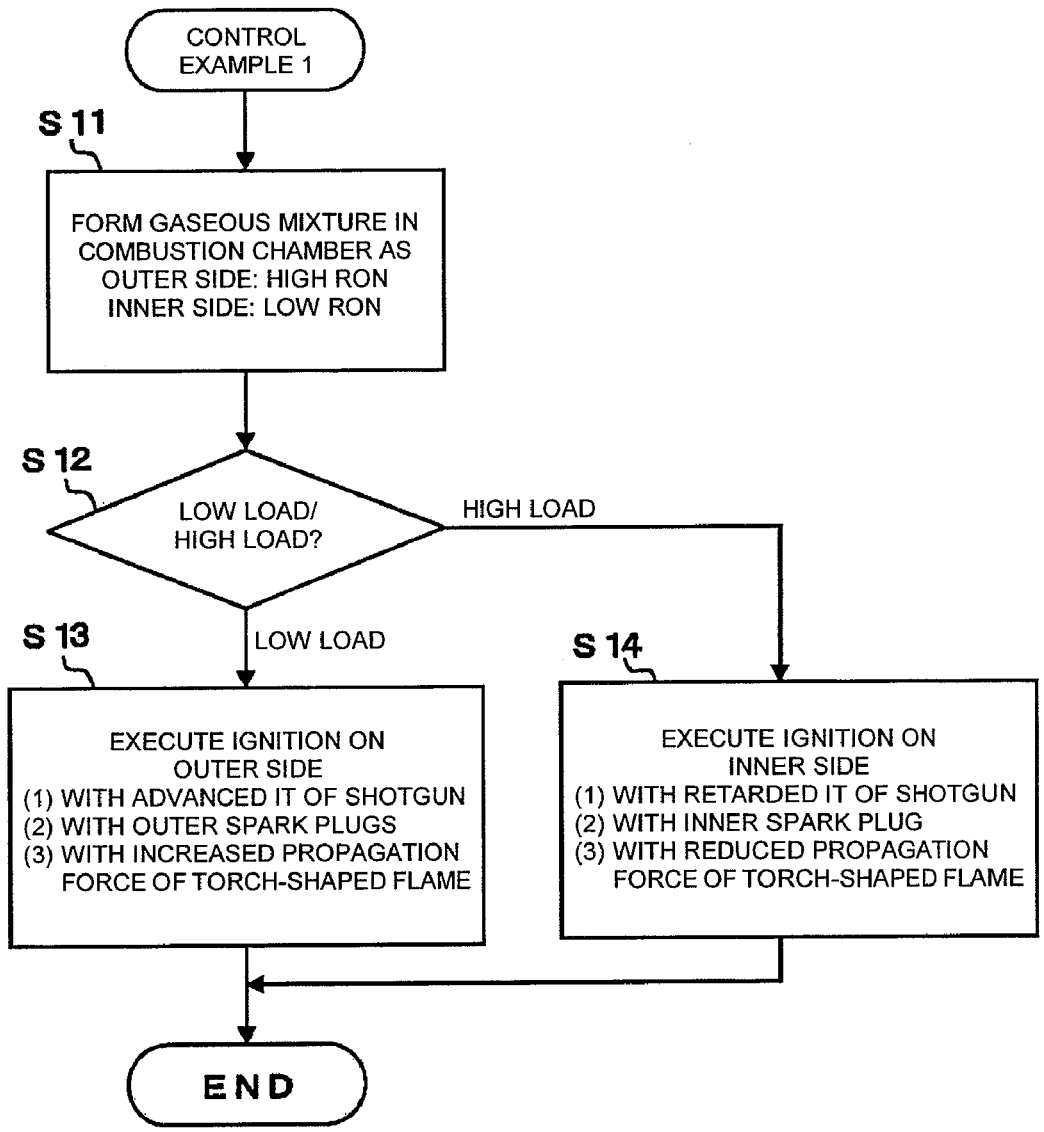
FIG. 13 is a flow diagram representing a combination control example (1)

The control example shown in the flow diagram of FIG. 13 is a case in which, as in the first embodiment, processing is performed in the manner that, at step S11, the gaseous mixture of the high octane fuel is formed in the peripheral area of the combustion chamber 1 and the gaseous mixture of the low octane fuel is formed in the central area of the combustion chamber 1. In this case, the processing proceeds to either step S13 or step S14 in accordance with a determination of whether the load state is a low load or high load state.

In the low load state, the processing proceeds to step S13, and the high octane fuel is ignited on the peripheral area of the combustion chamber 1 in accordance with any one of processes (1) to (3) described below.

(1) Process using an advanced injection timing or IT: Similarly as in the first and second embodiments, the third fuel injection valve 13 for supplying the initial ignition fuel is used, and the IT is advanced, thereby to execute ignition on the peripheral area of the combustion chamber 1.

(2) Process using the outer spark plugs: Similarly as in the third embodiment, the outer spark plugs 17 are used, and ignition is executed on the peripheral area of the combustion chamber 1.

(3) Process with the increased propagation force of the flame: Similarly as in the fourth embodiment, the flame generated by the auxiliary chamber 22 and the spark plug 23 are used, and the flame propagation force is increased, thereby to execute ignition on the peripheral area of the combustion chamber 1.

In the high load state, the processing proceeds to S14, and the low octane fuel is ignited on the central area of the combustion chamber 1 in accordance with any one of processes (1) to (3) described below.

(1) Process using a retarded IT: Similarly as in the first and second embodiments, the third fuel injection valve 13 for supplying the initial ignition fuel is used, and the IT is retarded, thereby to execute ignition on the central area of the combustion chamber 1.

(2) Process using the inner spark plug: Similarly as in the third embodiment, the inner spark plug 16 is used, and ignition is executed on the central area of the combustion chamber 1.

(3) Process with the reduced propagation force of the flame: Similarly as in the fourth embodiment, the flame generated by the auxiliary chamber 22 and the spark plug 23 are used, and the flame propagation force is reduced, thereby to execute ignition on the central area of the combustion chamber 1.

The reach position of the initial ignition fuel can be controlled in the manner that the third fuel injection valve 13 for supplying the initial ignition fuel is used in combination with the variable compression ratio setting mechanism. In this case, however, since the compression ratio is reduced in the low load state and is increased in the high load state, the manner is not realistic from the viewpoint of knocking suppression.

Figure 14:
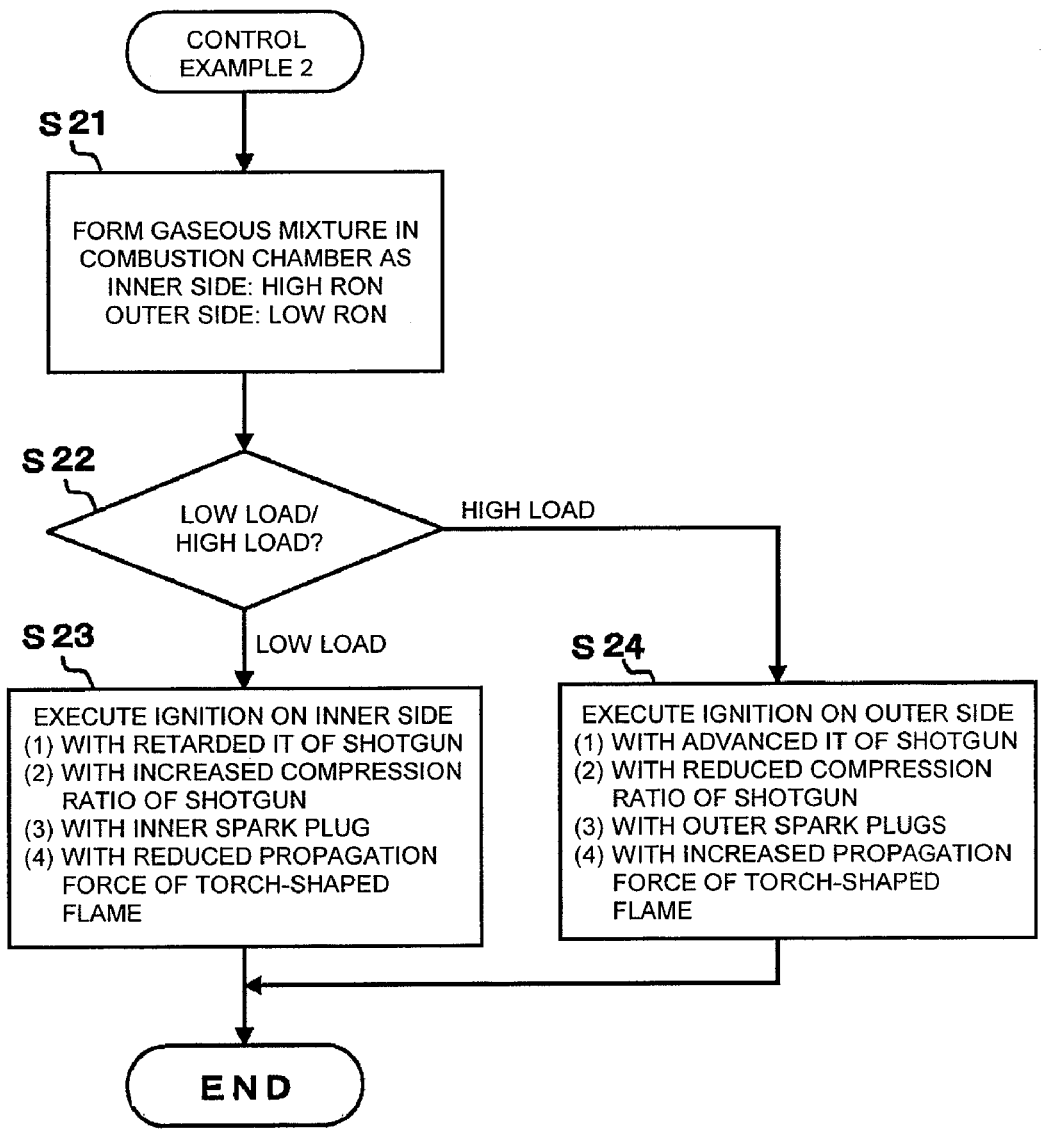
FIG. 14 is a flow diagram representing a combination control example (2)

The control example shown in the flow diagram of FIG. 14 is a case in which, as in the second and third embodiments, processing is performed in the manner that, at step S21, the gaseous mixture of the high octane fuel is formed in the central area of the combustion chamber 1, and the gaseous mixture of the low octane fuel is formed in the peripheral area of the combustion chamber 1. In this case, the processing proceeds to either step S23 or step S24 in accordance with a determination of whether the load state is a low load or high load state.

In the low load state, the processing proceeds to step S23, and the high octane fuel is ignited on the central area of the combustion chamber 1 in accordance with any one of processes (1) to (4) described below.

(1) Process using a retarded IT: Similarly as in the first and second embodiments, the third fuel injection valve 13 for supplying the initial ignition fuel is used, and the IT is retarded, thereby to execute ignition on the central area of the combustion chamber 1.

(2) Process with the reduced compression ratio of the shotgun: Similarly as in the first and second embodiments, the third fuel injection valve 13 for supplying the initial ignition fuel is used, and the variable compression ratio setting mechanism are used to increase the compression ratio thereof, thereby to execute ignition on the central area of the combustion chamber 1.

(3) Process using the inner spark plug: Similarly as in the third embodiment, the inner spark plug 16 is used, and ignition is executed on the central area of the combustion chamber 1.

(4) Process with the reduced propagation force of the flame: Similarly as in the fourth embodiment, the flame generated by the auxiliary chamber 22 and the spark plug 23 are used, and the flame propagation force is reduced, thereby to execute ignition in the central area of the combustion chamber 1.

In the high load state, the processing proceeds to S24, and the low octane fuel is ignited on the peripheral area of the combustion chamber 1 in accordance with any one of processes (1) to (4) described hereinbelow.

(1) Process using an advance IT: Similarly as in the first and second embodiments, the third fuel injection valve 13 for supplying the initial ignition fuel is used, and the IT is advanced, thereby to execute ignition on the peripheral area of the combustion chamber 1.

(2) Process with the increased compression ratio of the shotgun: Similarly as in the first and second embodiments, the third fuel injection valve 13 for supplying the initial ignition fuel is used, and the variable compression ratio setting mechanism is used to reduce the compression ratio thereof, thereby to execute ignition on the peripheral area of the combustion chamber 1.

(3) Process using the outer spark plugs: Similarly as in the third embodiment, the outer spark plugs 17 are used, and ignition is executed on the peripheral area of the combustion chamber 1.

(4) Process with the increased propagation force of the torch-shaped flame: Similarly as in the fourth embodiment, the flame generated by the auxiliary chamber 22 and the spark plug 23 are used, and the flame propagation force is increased, thereby to execute ignition on the peripheral area of the combustion chamber 1.

The gaseous mixture distribution control is inclusive of the following.

The low and high octane fuels are not required to be distributed to the central and peripheral areas of the combustion chamber 1, in stratified patterns formed in the concentric radial direction. For example, as shown in FIG. 15A, the pattern may be a first dimensional pattern or disposition, such as in an engine intake-exhaust direction or front-rear direction. In addition, as shown in FIGS. 15B and 15C, the respective gaseous mixture concentration distributions include uniform and non-uniform distributions.

Further, the control of the distributions of the low and high octane fuels to the central and peripheral areas of the combustion chamber 1 corresponding to the operation conditions does not deny or exclude the case of operation in a so-called "uniform mixture state" in which the low octane fuel and the high octane fuel are mixed together in a low load region, high load region, or intermediate region. In other words, the present invention can be adapted to engines of the type in which a plurality of fuels different in octane number are supplied to a combustion chamber under at least a part of operation conditions, and combustion is executed by distributing the fuels into different portions of the combustion chamber.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An internal combustion engine comprising:
   a first fuel injector that supplies a first fuel to a first predetermined region in a combustion chamber;
   a second fuel injector that supplies a second fuel to a second predetermined region in the combustion chamber, the second fuel having an octane number that is different than an octane number of the first fuel, the second predetermined region being different from the first predetermined region;
   an ignition device configured to start ignition of one of the first and second fuels based on an ignition signal;
   an operation condition detector that detects at least one engine operating condition; and
   a controller configured determine which one of the first and second fuels to ignite by the ignition device based on the engine operation condition and to then provide the ignition signal to the ignition device.

2. The internal combustion engine according to claim 1, wherein
   the controller is configured to provide the ignition signal to start ignition of the first fuel in a high load engine operating condition, and
   the second fuel has an octane number that is higher than the octane number of the first fuel.

3. The internal combustion engine according to claim 2, wherein
   the second fuel is distributed to a peripheral area of the combustion chamber, and
   the first fuel is distributed to a central area of the combustion chamber.

4. The internal combustion engine according to claim 3, wherein the second fuel is distributed to the peripheral area of the combustion chamber via one of an air injection valve or an exhaust gas recirculation valve in fluid communication with the combustion chamber.

5. The internal combustion engine according to claim 3, wherein the peripheral area defines an annulus.

6. The internal combustion engine according to claim 2, wherein the second fuel is distributed to a central area of the combustion chamber, and the first fuel is distributed to a peripheral area of the combustion chamber.

7. The internal combustion engine according to claim 6, wherein the peripheral area defines an annulus.

8. The internal combustion engine according to claim 2, wherein
   the ignition device includes a third fuel injection valve configured to distribute a third fuel operative as an initial ignition fuel into a central area of the combustion chamber, the third fuel having an octane number that is equal to or lower than the octane number of the first fuel, and
   the controller is configured to adjust the dispersion of the third fuel by adjusting an injection timing of the third fuel injection valve.

9. The internal combustion engine according to claim 8, further comprising a variable compression ratio setting mechanism that varies the compression ratio of the engine, the dispersion of the third fuel being effected by varying the compression ratio.

10. The internal combustion engine according to claim 2, wherein the ignition device includes a plurality of spark plugs provided corresponding to the first and second predetermined regions, and the controller is configured to provide the ignition signal to at least one of the plurality of spark plugs corresponding to first or second fuel to be ignited based on the engine operation condition.

11. The internal combustion engine according to claim 10, further comprising a variable compression ratio selling mechanism that varies the compression ratio of the engine.

12. The internal combustion engine according to claim 2, wherein
   the ignition device includes an auxiliary chamber communicating with the combustion chamber through an opening and a spark plug for igniting a fuel in the auxiliary chamber, to expel a flame into the combustion chamber through the opening, and
   the controller is configured to select which one of the first and second fuels to ignite by the ignition device by regulating a propagation force of the flame.

13. The internal combustion engine according to claim 12, wherein the spark plug includes a first electrode and a second electrode spaced farther from the auxiliary chamber opening than the first electrode, and the controller regulates the propagation force of the flame by activating one of the first and second electrodes.

14. The internal combustion engine according to claim 12, further comprising a variable compression ratio setting mechanism that varies the compression ratio of the engine, the controller regulating the propagation force of the flame by varying the compression ratio.

15. An internal combustion engine comprising:
   means for injecting a first fuel to a first predetermined region in a combustion chamber;
   means for injecting a second fuel to a second predetermined region in the combustion chamber, the second fuel having an octane number that is different than an octane number of the first fuel, the second predetermined region being different from the first predetermined region;
   means for igniting one of the first and second fuels based on an ignition signal;
   means for detecting at least one engine operating condition; and
   means for controlling which one of the first and second fuels is ignited and then generating the ignition signal based on the engine operation condition.

16. A fuel control method for an internal combustion engine, the method comprising:
   distributing a first fuel to a first predetermined region in a combustion chamber;

distributing a second fuel to a second predetermined region in the combustion chamber, the second fuel having an octane number different than an octane number of the first fuel, the second predetermined region being different from the first predetermined region;

detecting an operation condition of the engine;

determining based on the operation condition of the engine whether to start ignition of the first fuel or the second fuel; and starting ignition of the first or the second fuel according to the determination.

* * * * *